(12) United States Patent
Yuasa et al.

(10) Patent No.: US 6,980,165 B2
(45) Date of Patent: Dec. 27, 2005

(54) COMMUNICATION APPARATUS WITH ANTENNA (75) Inventors: Tomokazu Yuasa, Tokyo (JP); Toshiki Miyasaka, Saitama (JP); Toshiyuki Masaki, Saitama (JP); Tatsuo Nitta, Tokyo (JP); Takashi Minemura, Tokyo (JP); Takashi Amano, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/698,553

(22) Filed: Oct. 31, 2003

(65) Prior Publication Data

US 2004/0150570 A1 Aug. 5, 2004

(30) Foreign Application Priority Data

Jan. 31, 2003 (JP) .............................. 2003-023877

(51) Int. Cl.[7] .......................... H01Q 1/12; H04M 9/00; H04M 1/00
(52) U.S. Cl. .................. 343/718; 379/430; 455/575.2
(58) Field of Search ................ 343/700 MS, 718; 379/430; 381/312; 455/575.2

(56) References Cited

U.S. PATENT DOCUMENTS

| | | | | |
|---|---|---|---|---|
| 4,041,497 A | * | 8/1977 | Palmaer ...................... 343/702 |
| 4,882,745 A | * | 11/1989 | Silver ....................... 455/575.2 |
| 5,815,126 A | * | 9/1998 | Fan et al. ....................... 345/8 |
| 5,886,667 A | * | 3/1999 | Bondyopadhayay . 343/700 MS |
| 6,356,773 B1 | * | 3/2002 | Rinot ....................... 455/575.1 |
| 2002/0021800 A1 | * | 2/2002 | Bodley et al. .............. 379/430 |
| 2002/0090099 A1 | * | 7/2002 | Hwang ....................... 381/312 |
| 2002/0198021 A1 | * | 12/2002 | Boesen ....................... 455/556 |
| 2003/0157903 A1 | * | 8/2003 | Begic ......................... 455/90 |
| 2003/0210801 A1 | * | 11/2003 | Naksen et al. ............. 381/370 |
| 2004/0136543 A1 | * | 7/2004 | White et al. .................. 381/74 |
| 2004/0198464 A1 | * | 10/2004 | Panian .................... 455/569.1 |
| 2004/0204207 A1 | * | 10/2004 | Parker ..................... 455/575.2 |
| 2004/0242278 A1 | * | 12/2004 | Tomoda et al. ............. 455/563 |
| 2004/0253972 A1 | * | 12/2004 | Iwai et al. ............... 455/550.1 |
| 2005/0017911 A1 | * | 1/2005 | Lee ........................... 343/718 |

FOREIGN PATENT DOCUMENTS

| | | | | |
|---|---|---|---|---|
| JP | 2-123192 | | 10/1990 | |
| JP | 8-125614 | | 5/1996 | |
| JP | 09270729 | * | 10/1997 | ............ H04B 1/38 |
| JP | P9-270729 | | 10/1997 | |
| JP | 11-008893 | * | 1/1999 | ............ H04R 1/10 |
| JP | 11-8893 | | 1/1999 | |
| JP | 11-8894 | | 1/1999 | |
| JP | P2002-57786 | | 2/2002 | |
| JP | P2002-112383 | | 4/2002 | |

* cited by examiner

Primary Examiner—Hoang V. Nguyen
Assistant Examiner—Leith A. Al-Nazer
(74) Attorney, Agent, or Firm—Foley & Lardner LLP (57) ABSTRACT

A communication apparatus has a speaker, a headband which connects to the speaker at an end thereof, a wireless communication module coupled to the speaker, and an antenna arranged on the headband, and coupled to said wireless communication module.

14 Claims, 6 Drawing Sheets

COMMUNICATION APPARATUS WITH ANTENNA

CROSS-REFERENCE TO RELATED APPLICATIONS

This application is based upon and claims the benefit of priority from Japanese Patent Application No. 2003-23877, filed Jan. 31, 2003, the entire contents of which are incorporated herein by reference.

BACKGROUND OF THE INVENTION

1. Field of the Invention

This invention relates to a communication apparatus having an antenna and wireless communication functions, such as a portable headphone, or a portable headset.

2. Description of the Related Art

In recent years, developments have been made particularly in various portable communication apparatuses having close-range wireless communication functions. Products called headphones or headsets have been developed as portable communication apparatuses. Here, headphones mainly correspond to a portable audio device having an audio speaker which reproduces music data. Meanwhile, the headset has a function for conversation or data communication and has both a speaker and microphone and is utilized, for example, in connection with a cellular telephone.

Japanese Patent Application Publication (KOKAI) No. 9-270729 discloses a headset-type communication device having a satellite communication cellular telephone function. This device has a structure in which a pair of ear pad parts (earmuffs) including speakers are connected to each other by a headband, and an antenna is attached to one of the ear pad parts. In this device, a rod-like antenna is provided in the form of a protrusion from one ear pad part. When using this device as a bi-directional communication apparatus, the device may be provided with a microphone arm.

Japanese Patent Application Publication (KOKAI) No. 2002-112383 discloses a headphone-type communication device having a function of digital transmission/reception to/from an audio player, and reproduces music data transmitted from the audio player.

When a user wears the headset/headphone communication device as described above on the head, the communication device is used with its antenna situated along the temporal region of the head. Therefore, the temporal region of the head may block out electric waves from a satellite functioning as a source which sends data, depending on the orientation of the user relative to the signal source. The gain of the antenna hence decreases. To avoid this problem, the portable wireless terminal is constructed in a structure comprising a terminal body, an antenna support tool attached to the head of the user who uses the portable wireless terminal, and an antenna supported on the head of the user by the antenna support tool and connected to the terminal body by an antenna cable. In this way, the antenna is positioned above the head of the user, so that communication is enabled without concern about the situation of use of the portable terminal or the direction thereof.

However, since the antenna is provided in the side of only one of the ear pad parts, the head of the user may still shut out electric waves. This leads to a great decrease in antenna gain, depending on the positional relationship with devices as a target of communication. Further, the form of the antenna protruding from the ear pad part is not practical, from the aspects of safety and design.

BRIEF SUMMARY OF THE INVENTION

Embodiments of the present invention provide a communication apparatus with a pointing device on the housing.

According to an embodiment of the present invention, a communication apparatus has a speaker, a headband which connects the speaker at an end thereof, a wireless communication module coupled to the speaker, and an antenna arranged on the headband, and coupled to said wireless communication module.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF PREFERRED EMBODIMENTS

Preferred embodiments according to the present invention will be described hereinafter with reference to the accompanying drawings.

Figure 1:
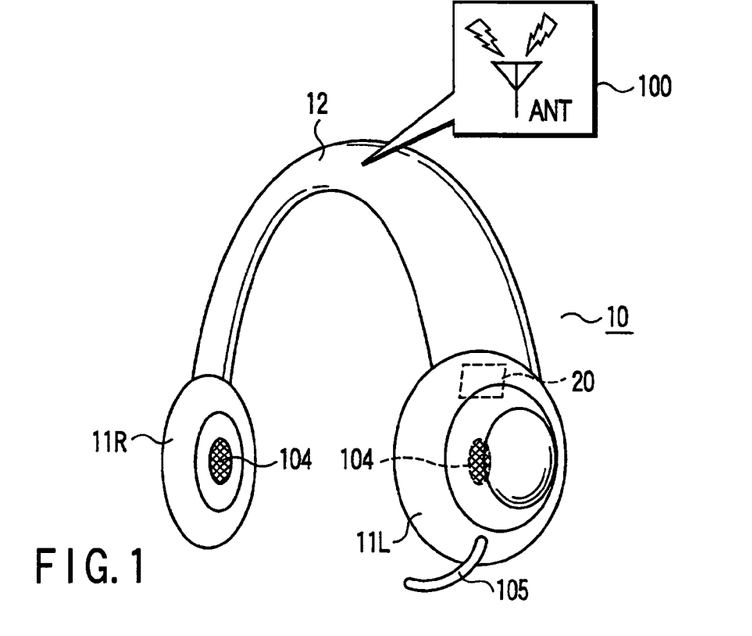
FIG. 1 is a perspective view showing a headset according to a first embodiment of the present invention.
Figure 2:
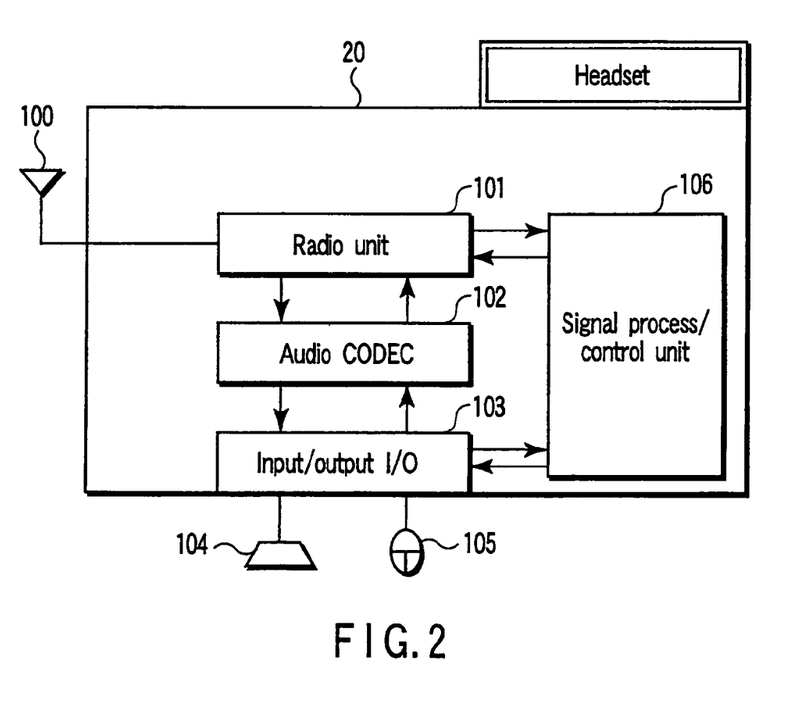
FIG. 2 is a block diagram showing a wireless communication module in the first embodiment.

FIG. 1 shows a headset 10 as a communication apparatus according to a first embodiment. FIG. 2 shows a wireless communication module 20 arranged in the headset 10.

The headset 10 has left and right ear pads (earmuff parts) 11R and 11L, and a headband 12 corresponding to a coupling member which holds the ear pad 11R and 11L. Further, an antenna element 100 is included in the center part of the headband 12, i.e., the parietal region where a user wears the headset 10.

The headset 10 has a pair of speakers 104 for reproducing audio, and each of speakers 104 is arranged in each of the ear pads 11R and 11L respectively. In addition, the left ear pad 11L includes the wireless communication module 20 as shown in FIG. 2. A microphone 105 for inputting audio is shown mounted to protrude from the left ear pad 11L As shown in FIG. 2, the wireless communication module 20 has a radio unit 101, an audio CODEC 102, an input/output interface 103, and a signal process/control unit 106. The radio unit 101 demodulates signals received by the antenna element 100. The audio CODEC 102 reproduces audio signals from the signals demodulated by the radio unit 101. The input/output interface 103 outputs audio signals from the audio CODEC 102 to the speakers 104.

Also, the headset 10 has a microphone 105 for bi-directional communication. The input/output interface 103 sends audio signals inputted from the microphone 105 to the radio unit 101 via the audio CODEC 102. The radio unit 101 modulates the inputted audio signals and transmits the signals via the antenna element 100.

The signal process/control unit 106 processes control signals received via the antenna element 100 and the radio unit 101. The unit 106 also transmits generated control signals via the radio unit 101 and the antenna element 100.

The wireless communication module 20 is included in, for example, the left ear pad 11L, and is connected to the antenna element 100 via a printed cable. But, the wireless communication module 20 may be mounted outside the headset 10 with a cable connecting between the headset 10 and the wireless communication module 20.

Figure 3A:
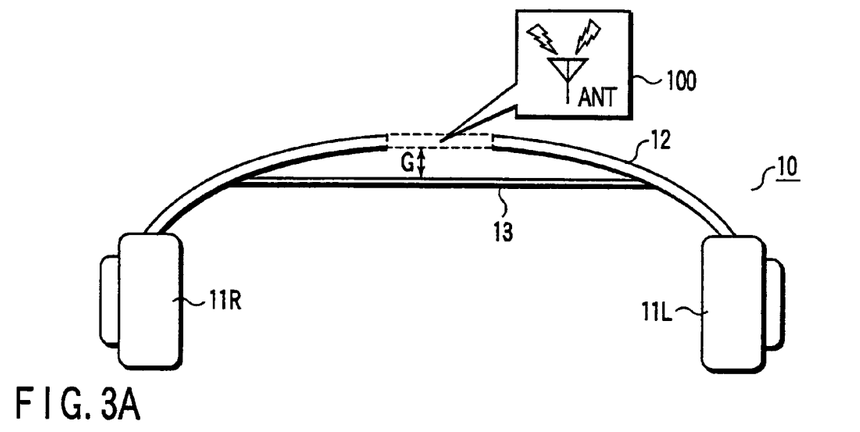
FIGS. 3A and 3B are views showing the headset in the first embodiment.
Figure 3B:
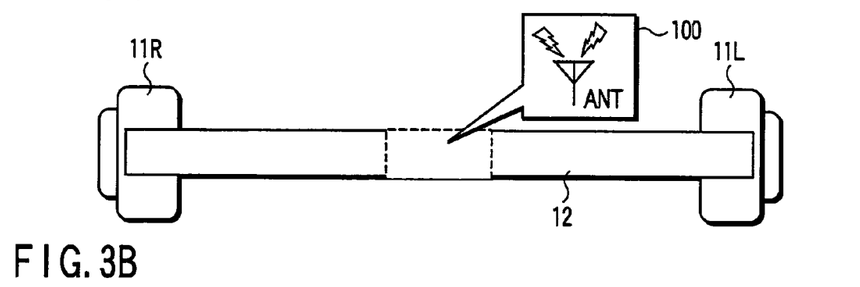

FIGS. 3A and 3B show an arrangement of the antenna element 100 in the headset 10. FIG. 3A is a side view and FIG. 3B is a top view of the headset 10.

The antenna element 100 is provided at the center part or parietal region of the headband 12. The position of the antenna element 100 is higher than that of the speakers 104 or the ear pads 11R, and 11L. The headband 12 is made of, for example, plastic material and is a flexibly deformable member. In normal use, the headset 10 is put on the head of the user. When wearing the communication apparatus, the headband 12 is deformed along the contour of the head of the user. Therefore, the antenna element 100 mounted on the headband 12 has a flexible structure so that the element 100 may be warped in accordance with the deformation of the headband part 12.

More specifically, as shown in FIGS. 4A–4E, the antenna element 100 is mounted on a flexible printed circuit board (hereinafter "FPC") 40 which may warp or is deformable. The antenna element 100 is made of a plastic material having a high dielectric constant and printed on the FPC 40. Further, the ground (hereinafter "GND") pattern on the FPC 40 is selected such that the circumferential length of the ground pattern falls within the range of ±50% with respect to the wavelength of the electric wave received. By selecting this length, part of the GND resonates when receiving the electric wave. Thus, the efficiency of receiving waves may be greatly improved.

Figure 4A:
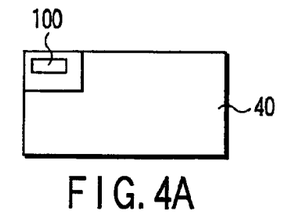
FIGS. 4A–4E are plan views showing a flexible printed circuit board in the first embodiment.
Figure 4B:
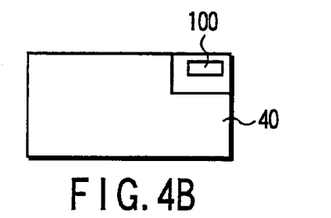
Figure 4C:
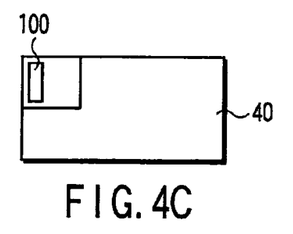
Figure 4D:
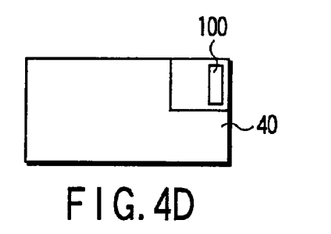
Figure 4E:
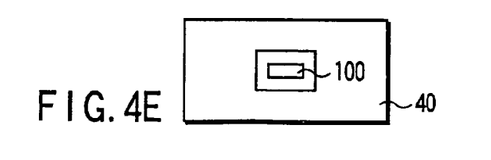

The radiation characteristics of the antenna element 100 have a directivity depending on the layout of the antenna element 100 on the FPC 40 and the direction of the FPC 40. Various practical layouts are as shown in FIGS. 4A to 4E. FIG. 4A shows an example in which the antenna element 100 is set transversely at the left end. FIG. 4B shows an example in which the antenna element 100 is set transversely at the right end. FIG. 4C shows an example in which the antenna element 100 is set longitudinally at the left end. FIG. 4D shows an example in which the antenna element 100 is set longitudinally at the right end. Further, FIG. 4E shows an example in which the antenna element 100 is set at the substantial center part of the FPC.

The antenna element 100 may be an inverted-F antenna element which is constituted by a pattern of metal foil formed as part of the FPC. In this case, the pattern is formed in the same plane as the GND pattern on the FPC. In this structure the antenna element 100 does not substantially increase the thickness of the FPC constituted without the antenna. the Therefore, the headband 12 may be thinner. At the same time, the GND pattern resonates when an electric wave is received. As a result, the efficiency of receiving waves may be improved.

Further, as shown in FIGS. 3A and 3B, an insertion 13 connects the inside of an arc portion of the headband 12, and interposes between headband 12 and the head of the user when the headset 10 is put on the user's head. The insertion 13 is an elastic member made of rubber or plastic material, and prevents the headband 12 from coming off the head of the user. In the present embodiment, a predetermined distance indicated by the arrow G, e.g., 5 mm or more is maintained between the head of the user and the antenna element 100 mounted on the headband 12. Alternatively, the thickness of the headband 12 may be thick enough to maintain the predetermined distance between the head of the user and the antenna element 100.

Figure 5A:
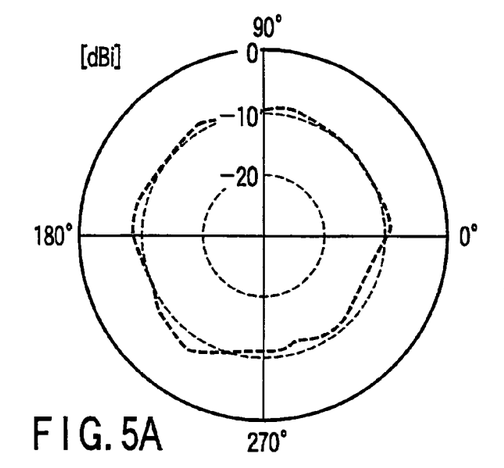
FIG. 5A is a graph showing an example of a radiation pattern corresponding to the layout of an antenna element according to the first embodiment.
Figure 5B:
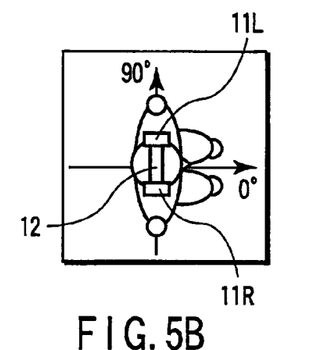
FIG. 5B shows the headset mounted on a user illustrating the relative orientation of the headset for producing the patter on FIG. 5A.
Figure 6A:
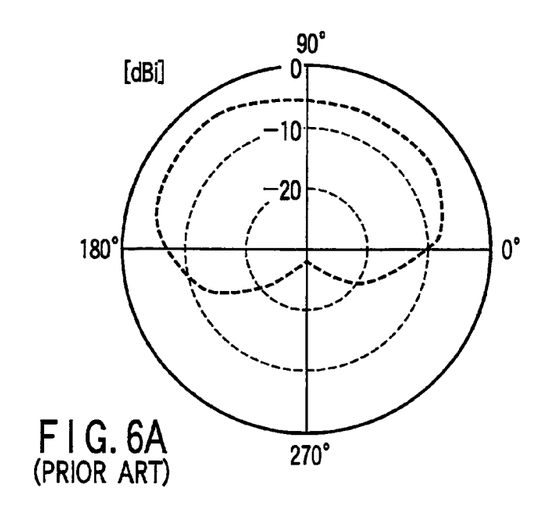
FIG. 6A is a graph showing a radiation pattern corresponding to the layout of an antenna element according to a conventional headset.
Figure 6B:
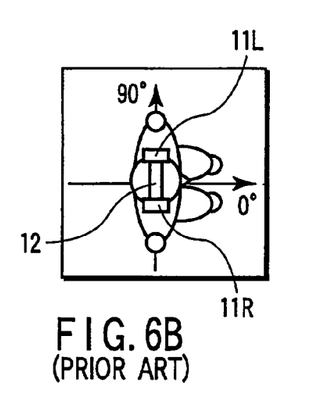
FIG. 6B shows the headset mounted on a user illustrating the relative orientation of the headset for producing the patter on FIG. 6A.

In short, according to the structure of the first embodiment, the antenna element 100 is mounted on the headband 12. Therefore, an electric-wave arrival range of 360 degrees may be realized when the user wears the headset 10. FIG. 5A shows an example of radiation pattern corresponding to the layout of the antenna element 100 according to the first embodiment. FIG. 6A shows an example of radiation pattern in the case where the antenna is provided on the left temporal region of the head of the user, as in the prior art. FIGS. 5B and 6B show a plan view of the state in which the user wears the headset 10, corresponding to FIGS. 5A and 6A respectively.

If the antenna is provided at the temporal region of the head of the user in one side, as in the prior art, the electric wave is at least partially blocked off and/or attenuated because of the existence of the user's head when the electric wave travels in the direction opposite to the side in which the antenna is provided. Consequently, the arrival range of the electric wave is narrowed. In contrast, in the structure of the first embodiment, the antenna element 100 is provided at the parietal region of the head of the user. As a result, there is no obstacle which will shut off the electric wave. Therefore, the electric-wave arrival range may cover the direction opposite to the antenna. The electric-wave arrival range may thus cover all directions.

Further, the antenna element 100 is included in the headband 12. Therefore, it is possible to avoid such a situation that the protruding antenna contacts persons or objects in the periphery. In addition, it is advantageous in that the communication apparatus is compact and has an improved outer appearance.

Figure 7:
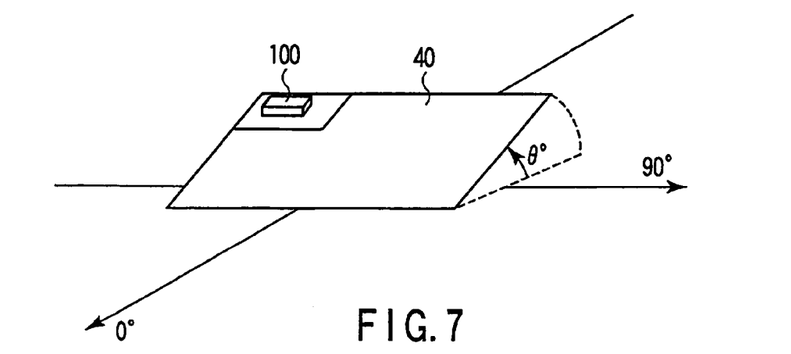
FIG. 7 is a diagram showing an arrangement of a flexible printed circuit board according to a second embodiment of the present invention.

FIG. 7 shows an arrangement of antenna element 100 of the second embodiment. In the second embodiment, the FPC 40 mounting the antenna element 100 is inclined at a predetermined inclination angle θ to the mounting surface of the headband 12 as shown in FIG. 7.

Figure 8A:
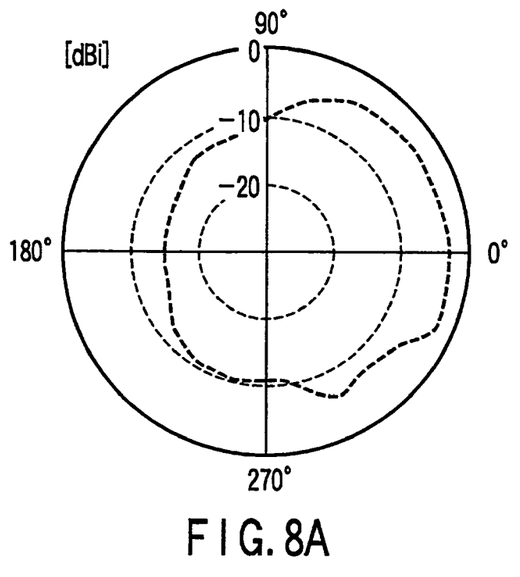
FIG. 8A is a graph showing an example of a radiation pattern corresponding to the layout of an antenna element according to the second embodiment.
Figure 8B:
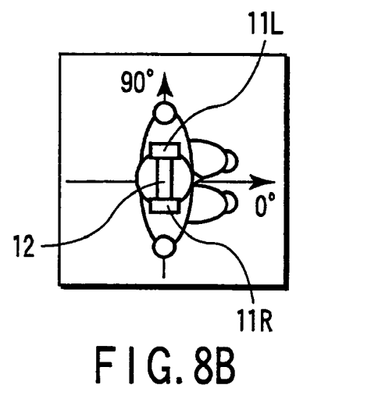
FIG. 8B shows the headset mounted on a user illustrating the relative orientation of the headset for producing the patter on FIG. 8A.

In the case that the antenna element 100 is inclined at the angle θ to the forward direction of the user when the user wears the communication apparatus, the radiation pattern obtained is better in the front side of the user, compared with the case of the angle 0° to the forward direction of the user, as shown in FIG. 8A. FIG. 8B is a plan view of the state in which the user wears the headset 10.

The structure of the second embodiment has advantages under certain types of situations such as when the headset 10 receives audio data from a digital audio player via wireless communication, and reproduces the sound through speakers 104 in the ear pad 11L and 11R or when the headset 10 establishes a wireless connection with a personal computer of the notebook type, or a cellular telephone, and various data is exchanged through the wireless connection.

In these types of usage, the radiation characteristics in the front side of the user are particularly important when the user wears the headset 10 on the head. In addition, the headband 12 may be positioned forwards the rear, depending on the wearing conditions of the user and the shape of the user's head. The radiation characteristics may then deteriorate. Hence, if the FPC 40 is mounted on the headband 12, inclined at a certain inclination angle (θ°) to the forward direction, the radiation characteristics in the front side are improved. Accordingly, the headset 10 with an inclined FPC 40 may provide for excellent wireless transmission/reception conditions.

Figure 9:
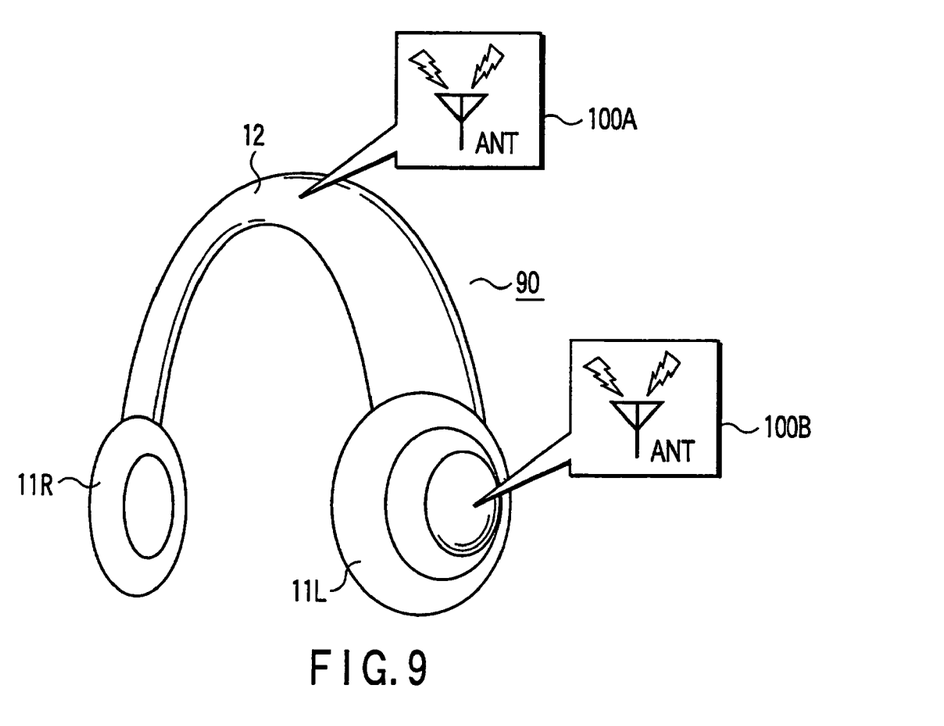
FIG. 9 is a perspective view showing a headset according to a third embodiment of the present invention.

FIG. 9 shows a headset 90 according to the third embodiment. The headset 90 has a first antenna element 100A and a second antenna element 100B. Specifically, the first antenna element 100A is mounted on an FPC (not shown in FIG. 9) and provided substantially at the center part or parietal region of the headband part 12, like the first embodiment. The second antenna element 100B is provided, for example, at the left ear pad (earmuff part) 11L. The second antenna element 100B mounted on an FPC may be provided at the ear pad 11L.

Figure 10:
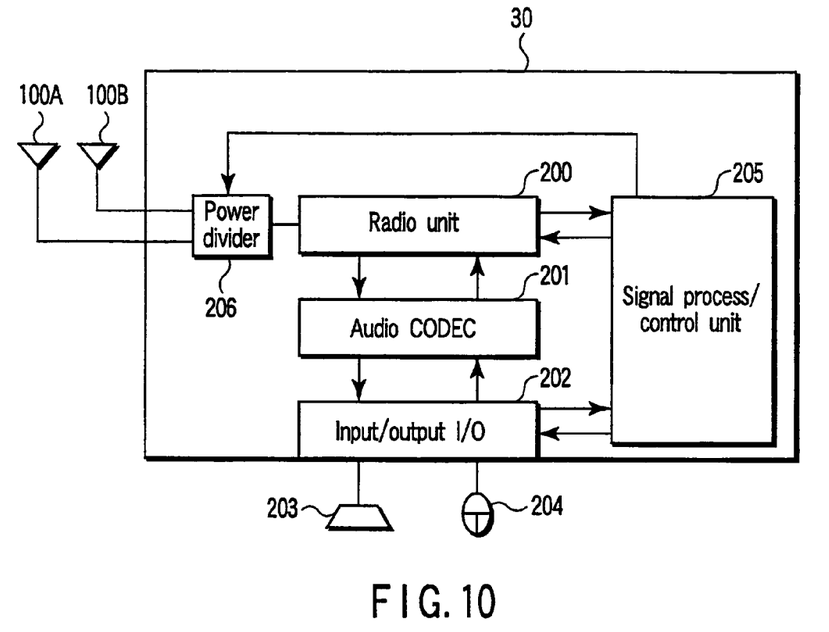
FIG. 10 is a block diagram showing a power divider type of a wireless communication module in the third embodiment.
Figure 11:
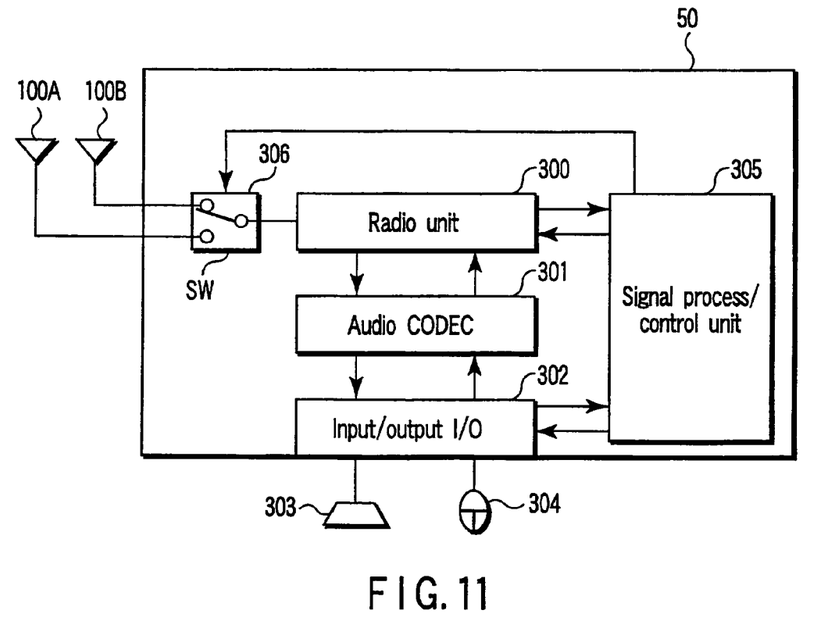
FIG. 11 is a block diagram showing a diversity type of a wireless communication module in the third embodiment.

Further, in the third embodiment, the ear pads 11R and 11L each include a speaker for reproducing audio. In addition, the left ear pad 11L includes a wireless communication module 30 or 50 as shown in FIG. 10 or 11. The wireless communication module 30 uses a power divider method in which electric power synthesis is performed on signals received by the respective antenna elements 100A and 100B. On the other hand, the wireless communication module 50 uses a diversity method in which power levels of signals received by the respective antenna elements 100A and 100B are compared and switched between the two.

Specifically, similar to the module 20 described as the first embodiment, the wireless communication module 30 of the power divider method has a radio unit 200, an audio CODEC 201, an input/output interface 202, and a signal process/control part 205. Further, the wireless communication module 30 has a power divider 206 connected to each of the antenna elements 100A and 100B.

On the other hand, also like the module 20 described as the first embodiment, the wireless communication module 30 using the diversity method has a radio unit 300, an audio CODEC 301, an input/output interface 302, and a signal process/control part 305. Further, the wireless communication module 50 has an antenna switch circuit 306 connected to each of the antenna elements 100A and 100B.

In brief, according to the structure of the third embodiment, the antenna elements 100A and 100B are respectively positioned on two portions of the head of the user, i.e., the parietal and temporal regions, when the user wears the headset 90. Therefore, compared with the case in which an antenna element 100 is provided only at the parietal region, the electric-wave arrival range may cover a range coming from an RF source located below the user's head. Therefore, by mounting plural antenna elements 100A and 100B, the radiation pattern characteristics of the antenna elements are mutually compensated for, so that much better radiation characteristics close to omni directional characteristics may be obtained.

Figure 12A:
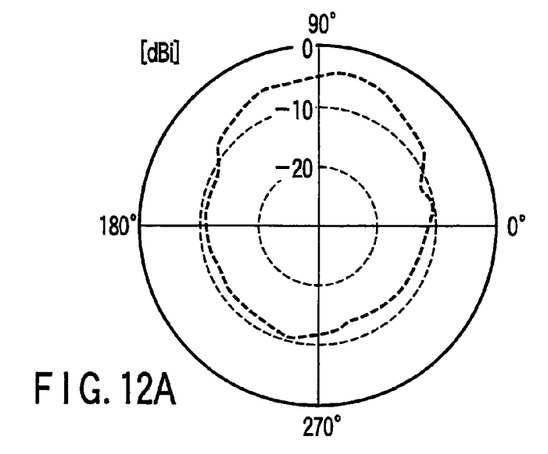
FIG. 12A is a graph showing an example of a radiation pattern corresponding to the layout of an antenna element according to the third embodiment.
Figure 12B:
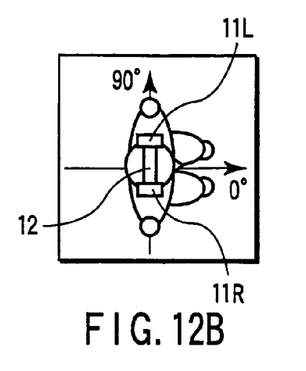
FIG. 12B shows the headset mounted on a user illustrating the relative orientation of the headset for producing the patter on FIG. 12A.

FIG. 12A shows an example of radiation pattern when the transmission power is distributed by the power divider 206 to the antenna elements 101A and 100B in the case of using the wireless communication module 30 using the power divider method. As is apparent from this characteristic graph, obtained characteristics are synthesized from the characteristics of the antenna element 100B at the left temporal region of the user which is the side of the ear pad 11L, and those of the antenna element 100B at the parietal region of the headband 12 (see FIG. 12B). That is, it is possible to obtain mutually complementary characteristics which are close to omni directional characteristics. In addition, the antennas do not protrude, so the same advantages as those of the foregoing first and second, embodiments may be obtained for the point of view of practical use and design appearance.

Figure 13:
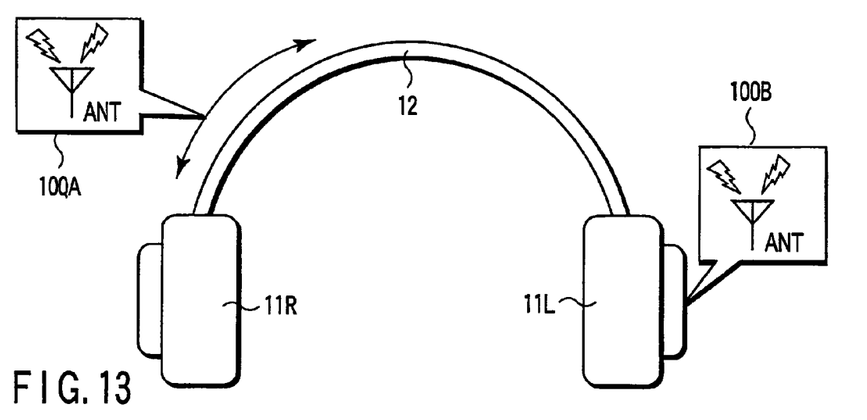
FIG. 13 is a front view showing a headset according to a fourth embodiment of present invention.

FIG. 13 shows a headset 90 of the fourth embodiment. In this embodiment, the second antenna element 100B is provided at the left ear pad 11L as in the third embodiment. On the other hand, the first antenna element 100A is provided to be offset in the direction, for example, toward the right ear pad 11R from the center part of the headband 12, such that a certain distance is maintained from the second antenna element 100B at the temporal region.

Figure 14A:
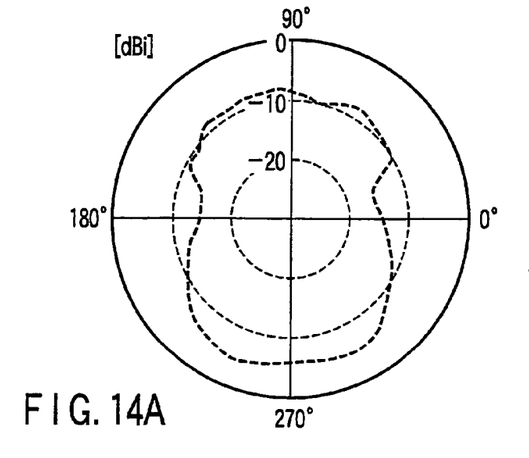
FIG. 14A is a graph showing an example of a radiation pattern corresponding to the layout of an antenna element according to the fourth embodiment.
Figure 14B:
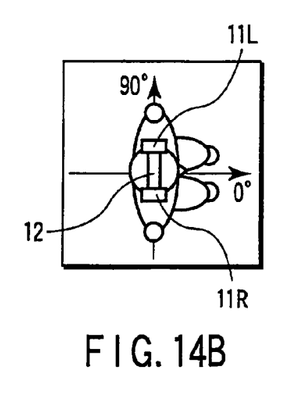
FIG. 14B is a plan view showing a state in which the user wears the communication apparatus.

According to this structure, it is possible to obtain strong radiation pattern characteristics in the direction toward the right side, compared with the case where the first antenna element 100A is provided at the parietal region as the center part of the headband part 12. FIG. 14B is a plan view showing a state in which the user wears the communication apparatus 90 of the fourth embodiment.

The present invention is not restricted to the above-mentioned first through fourth embodiments. The ear pads 11R and 11L do not have to be provided in the headset 10 or headset 90. The pair of speakers 104 may contact the ear of the user directly.

Further, it is not necessary that the headset 10 or 90 has two speakers 104. Only one speaker 104 may be provided at one end of the headband 12. The arrangement of the antenna element 100 may be similar to the first through the fourth embodiment. For example, the antenna element 100 may be provided at the center part or parietal region of the headband 12. As other example, one antenna element 100B may be arranged at the ear pad 11L which is only one ear pad, and the other antenna element 100B may be offset in the direction toward the other end of the headband 12 at which there is no ear pad.

All of aforementioned embodiments are applicable to the field of headphones which receive (digital) audio data from personal computers and PDAs by a close-range wireless communication function and reproduce the data via speakers. Also, those embodiments are applicable to a headphone or headset which comprises a microphone and enables audio communication via a portable telephone. Further, the embodiments are applicable to a headset which includes a portable telephone function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
   a speaker;
   a headband which connects to said speaker at an end thereof;
   a wireless communication module comprising transmitting and receiving circuitry coupled to said speaker; and
   an antenna arranged at a certain position on said headband, and coupled to said wireless communication module via a cable;
   a second antenna arranged at the end of said headband, and coupled to said wireless communication module;
   wherein the certain position is different from the end of the headband that connects to the speaker.

2. A communication apparatus according to claim 1, further comprising a flexible circuit board on which said antenna is mounted.

3. A communication apparatus according to claim 2, wherein said flexible circuit board is provided at a predetermined inclination angle to a mounting surface at the certain position of said headband.

4. A communication apparatus according to claim 1, wherein said antenna is arranged on a higher portion in said headband than said speaker in a condition under which said communication apparatus is used.

5. A communication apparatus according to claim 1, wherein, said headband has an arc portion, and the certain position on which said antenna is mounted is in the arc portion.

6. A communication apparatus according to claim 5, wherein said headband has an elastic member connected at two places in an inside area of the arc portion, and the elastic member is arranged apart from said antenna.

7. A communication apparatus according to claim 1, wherein the wireless communication module includes a radio unit, an audio CODEC, and input/output interface, and a signal process/control unit.

8. A communication apparatus comprising:
   a pair of speakers;
   a pair of ear pieces attached to said pair of speakers respectively;
   a headband with two ends which connect to each of said speakers respectively;
   a wireless communication module comprising transmitting and receiving circuitry coupled to said speakers; and
   an antenna arranged on a substantially central part of said headband, and coupled to said wireless communication module;
   wherein said wireless communication module is arranged at one of said ear pieces.

9. A communication apparatus according to claim 8, further comprising a flexible circuit board on which said antenna is mounted.

10. A communication apparatus according to claim 9, wherein said flexible circuit board is located at the substantially central part of said headband.

11. A communication apparatus according to claim 8, wherein said headband has an arc portion, and an elastic member connected at two places in an inside area of the arc portion, and the elastic member is arranged apart from said antenna.

12. A communication apparatus according to claim 8, wherein the wireless communication module includes a radio unit, an audio CODEC, an input/output interface, and a signal process/control unit.

13. A communication apparatus comprising:
   a pair of speakers;
   a pair of ear pieces attached to said pair of speakers respectively;
   a headband with two ends which connect to each of said speakers respectively;
   a wireless communication module comprising transmitting and receiving circuitry coupled to said speakers;
   an antenna arranged on a substantially central part of said headband, and coupled to said wireless communication module; and
   a second antenna arranged at one of said ear pieces.

14. A communication apparatus according to claim 13, wherein said antenna is located nearer the other ear pad piece than said ear piece part at which said second antenna element is provided.

* * * * *